United States Patent
Rothman et al.

(10) Patent No.: US 7,281,243 B2
(45) Date of Patent: Oct. 9, 2007

(54) SYSTEM AND METHOD TO ENABLE SEAMLESS DIFFUSION OF PLATFORM-BASED OPTIMIZED ROUTINES VIA A NETWORK

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 10/748,030

(22) Filed: Dec. 29, 2003

(65) Prior Publication Data

US 2005/0149919 A1 Jul. 7, 2005

(51) Int. Cl.
*G06F 9/44* (2006.01)
(52) U.S. Cl. .................................... 717/163
(58) Field of Classification Search ............... 717/153, 717/173, 176, 163; 713/1–2, 176, 300; 709/200, 709/203, 223–224; 370/352, 360, 384
See application file for complete search history.

(56) References Cited

U.S. PATENT DOCUMENTS

| | | | |
|---|---|---|---|
| 5,210,854 A | 5/1993 | Beaverton et al. | |
| 5,481,713 A | 1/1996 | Wetmore et al. | |
| 6,381,693 B2 | 4/2002 | Fish et al. | |
| 6,463,583 B1 | 10/2002 | Hammond | |
| 6,499,137 B1 * | 12/2002 | Hunt | 717/164 |
| 6,536,038 B1 | 3/2003 | Ewertz et al. | |
| 6,990,576 B2 | 1/2006 | Qureshi et al. | |
| 2003/0217193 A1 | 11/2003 | Thurston et al. | |
| 2004/0243534 A1 * | 12/2004 | Culter et al. | 707/1 |
| 2005/0021971 A1 * | 1/2005 | Patankar et al. | 713/176 |

OTHER PUBLICATIONS

Patel et al, 'Upgrading Transport Protocols using Untrusted Mobile Code', SOSP 03, Oct. 22, 2003, p. 1-14.*
Intel, "Extensible firmware Interface Specification," Version 1.02, Dec. 12, 2000.
Rubini et al. "Linux Device Drivers," O'Reilly & Associates, 2nd Edition, chapters 2, 3, 5, 13, 16, pp. 15-96, 128-180, 370-408, 506-525, Jun. 2001.

* cited by examiner

*Primary Examiner*—Meng-Al T. An
*Assistant Examiner*—Tuan A Vu
(74) *Attorney, Agent, or Firm*—Blakely, Sokoloff, Taylor & Zafman LLP (57) ABSTRACT

A system and method to diffuse optimized libraries via a network. An optimized library including at least one optimized routine is received by a processing system via a network. The optimized routine is provided for use by an application executing on the processing system to interact with a hardware entity of the processing system.

24 Claims, 8 Drawing Sheets

```
typedef struct {
      UINT32    PacketLength;
      EFI_GUID  Module Type;
      UINT64    ModuleRevision;
} OPTIMIZATION_PACKET;
```

FIG. 8

SYSTEM AND METHOD TO ENABLE SEAMLESS DIFFUSION OF PLATFORM-BASED OPTIMIZED ROUTINES VIA A NETWORK

CROSS REFERENCE TO RELATED APPLICATIONS

The present application is related to U.S. patent application Ser. No. 10/675,877, filed Sep. 29, 2003, entitled "UTILIZATION OF PLATFORM-BASED OPTIMIZATION ROUTINES BY A COMPUTER SYSTEM," and to U.S. patent application Ser. No. 10/611,122, filed Jun. 30, 2003, entitled "PLATFORM-BASED OPTIMIZATION ROUTINES PROVIDED BY FIRMWARE OF A COMPUTER SYSTEM," now issued as U.S. Pat. No. 7,159,105; both of which are assigned to the Assignee of the present application.

TECHNICAL FIELD

This disclosure relates generally to computer systems, and in particular but not exclusively, relates to diffusion of hardware optimized routines via a network.

BACKGROUND INFORMATION

The high-technology boom of recent years has delivered new and exciting technologies to the market place with increasing frequency. As advancements continue to march forward, research and development has intensified and product cycles compressed. In the case of processors, each iteration of a processor provides the consumer with new features to perform novel tasks or old tasks in a faster and more efficient manner. Often, a release of a new processor is coupled with the release of new software packages to leverage the new features. One such software packet may include a new compiler designed to compile applications to garner the benefit of the new processor features. Upon issue of a new compiler specially tailored for a new processor, software vendors often re-release old software applications re-compiled with the new compiler. Doing so allows the old software to execute in a more efficient manner on the new processor by leveraging the new features.

Modem operating systems ("OS's") often have access to optimized instruction sets (or routines) for execution on a particular hardware entity. For example, the Intel Pentium III processor includes an instruction set called SSE (Streaming SIMD (Single Instruction, Multiple Data) Extensions). SSE is a set of microprocessor instructions that allow software to tell the processor to carry out specific operations. By using these microprocessor instructions optimized for the Pentium III, OS's and software applications can leverage the full capabilities of the Pentium III. Optimized instructions can reduce the overall number of instructions required to execute a particular program task or otherwise execute the particular program task in a more efficient manner, resulting in an overall performance increase of the OS and/or application.

However, OS and application source code is compiled with specific processors in mind and without platform-specific knowledge. For example, software written and complied for an SSE processor may not be able to leverage advantages flowing from new instructions of an SSE2 processor. Optimized routines for other hardware entities, such as chipsets, may also be provided that cannot be fully anticipated at the time of software production. As such, software releases may substantially lag behind hardware developments leaving new features unused for substantial periods of time.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for diffusing optimized libraries containing optimized routines via a network to one or more processing systems are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
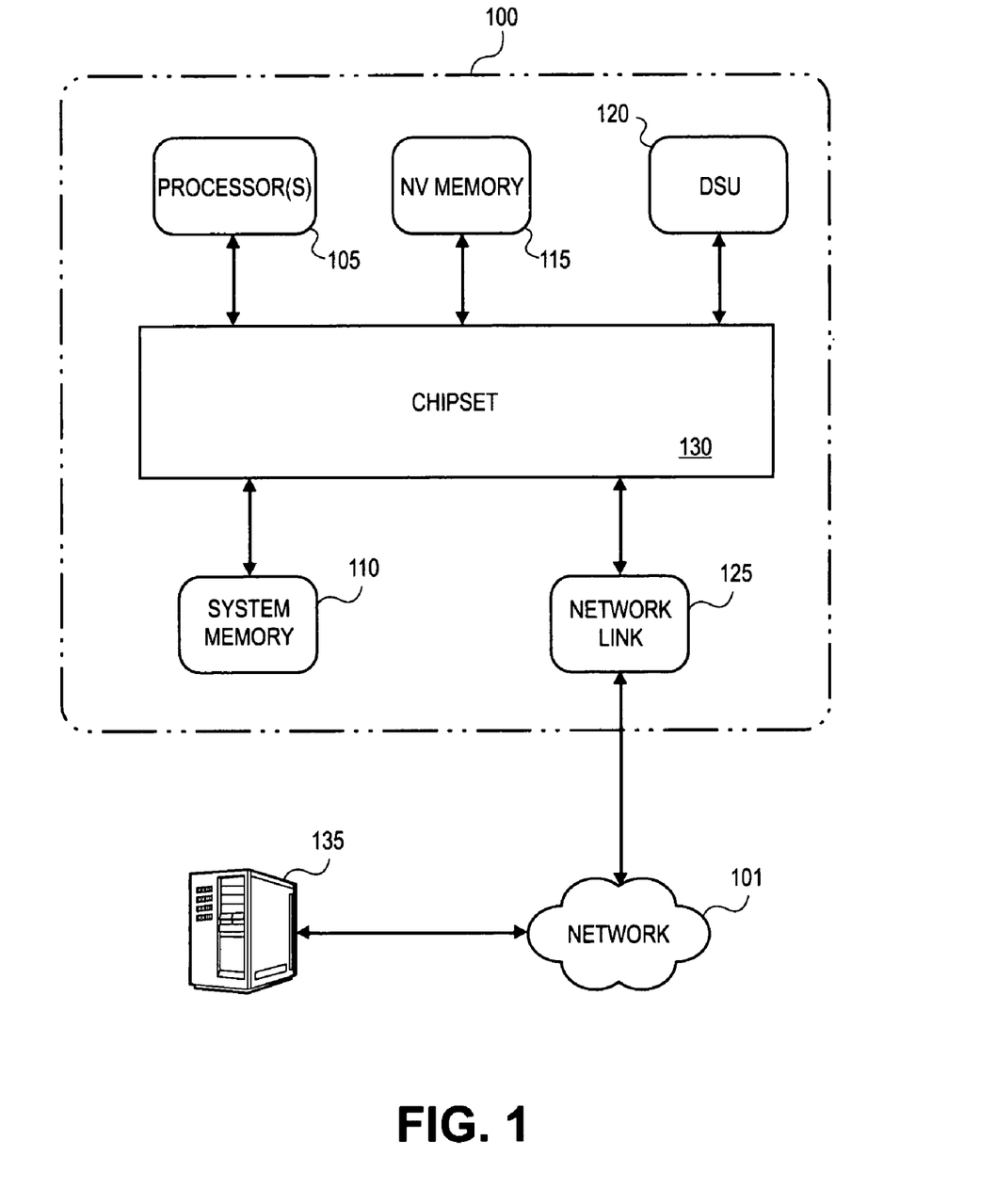
FIG. 1 is a block diagram illustrating a processing system for receiving platform-based optimization routines via a network, in accordance with an embodiment of the present invention.

FIG. 1 is a block diagram illustrating a processing system 100 for receiving optimized routines via a network 101, in accordance with an embodiment of the present invention. The illustrated embodiment of processing system 100 includes one or more processors (or central processing units) 105, system memory 110, nonvolatile ("NV") memory 115, a data storage unit ("DSU") 120, a network link 125, and a chipset 130. The illustrated processing system 100 may represent any networked computing system including a desktop computer, a notebook computer, a workstation, a handheld computer, a server, a blade server, or the like.

The elements of processing system 100 are interconnected as follows. Processor(s) 105 is communicatively coupled to system memory 110, NV memory 115, DSU 120, and network link 125, via chipset 130 to send and to receive instructions or data thereto/therefrom. In one embodiment, NV memory 115 is a flash memory device. In other embodiments, NV memory 115 includes any one of read only memory ("ROM"), programmable ROM, erasable programmable ROM, electrically erasable programmable ROM, or the like. In one embodiment, system memory 110 includes random access memory ("RAM"). DSU 120 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 120 is illustrated as internal to processing system 100, DSU 120 may be externally coupled to processing system 100. Network link 125 couples processing system 100 to network 101 such that processing system 100 may communicate with a server 135.

It should be appreciated that various other elements of processing system 100 have been excluded from FIG. 1 and this discussion for the purposes of clarity. For example, processing system 100 may further include a graphics card, additional DSUs, other persistent data storage devices (e.g., tape drive), and the like. Chipset 130 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 130.

Figure 2:
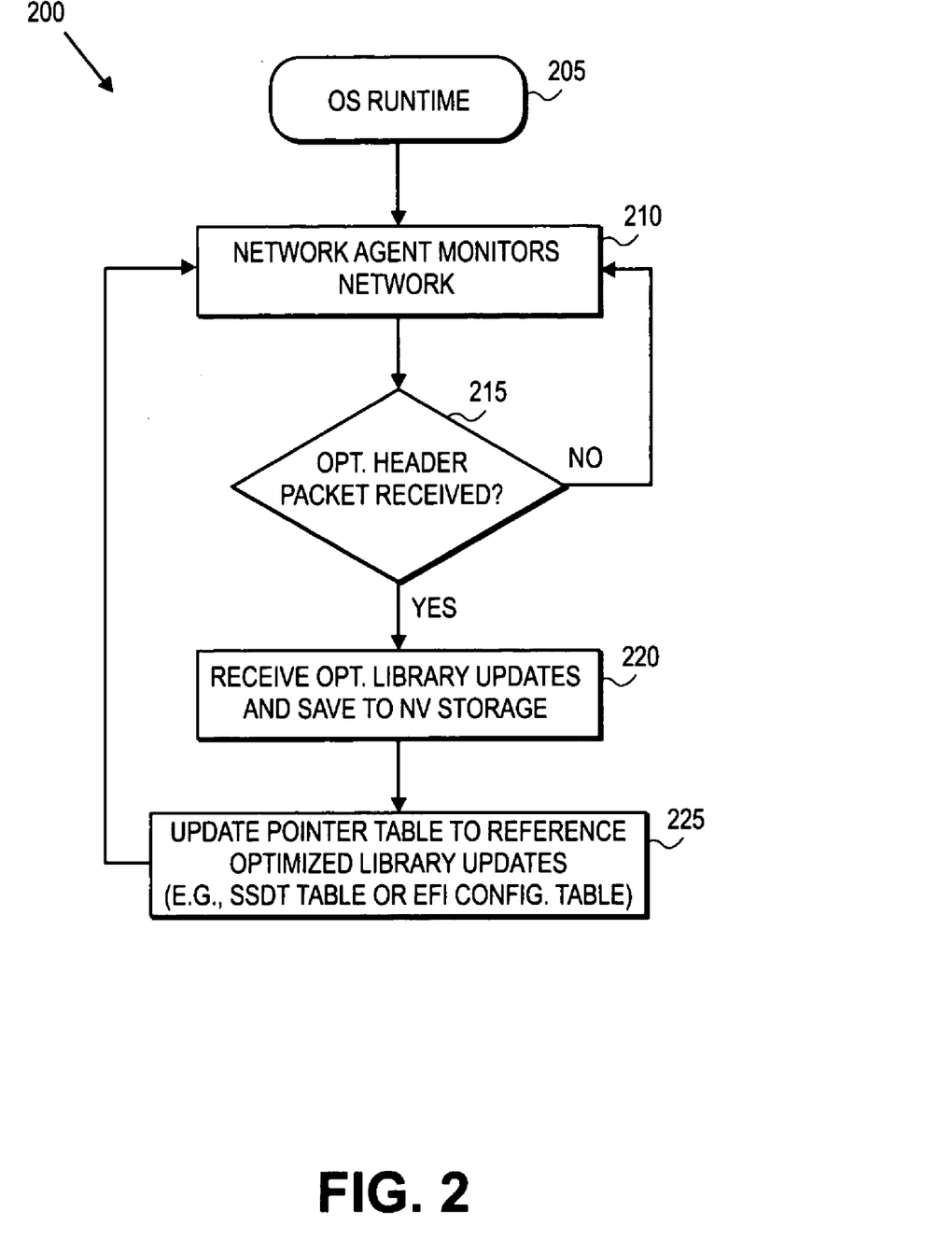
FIG. 2 is a flow chart illustrating a process for transferring platform-based optimization routines via a network to a processing system, in accordance with an embodiment of the present invention.
Figure 3:
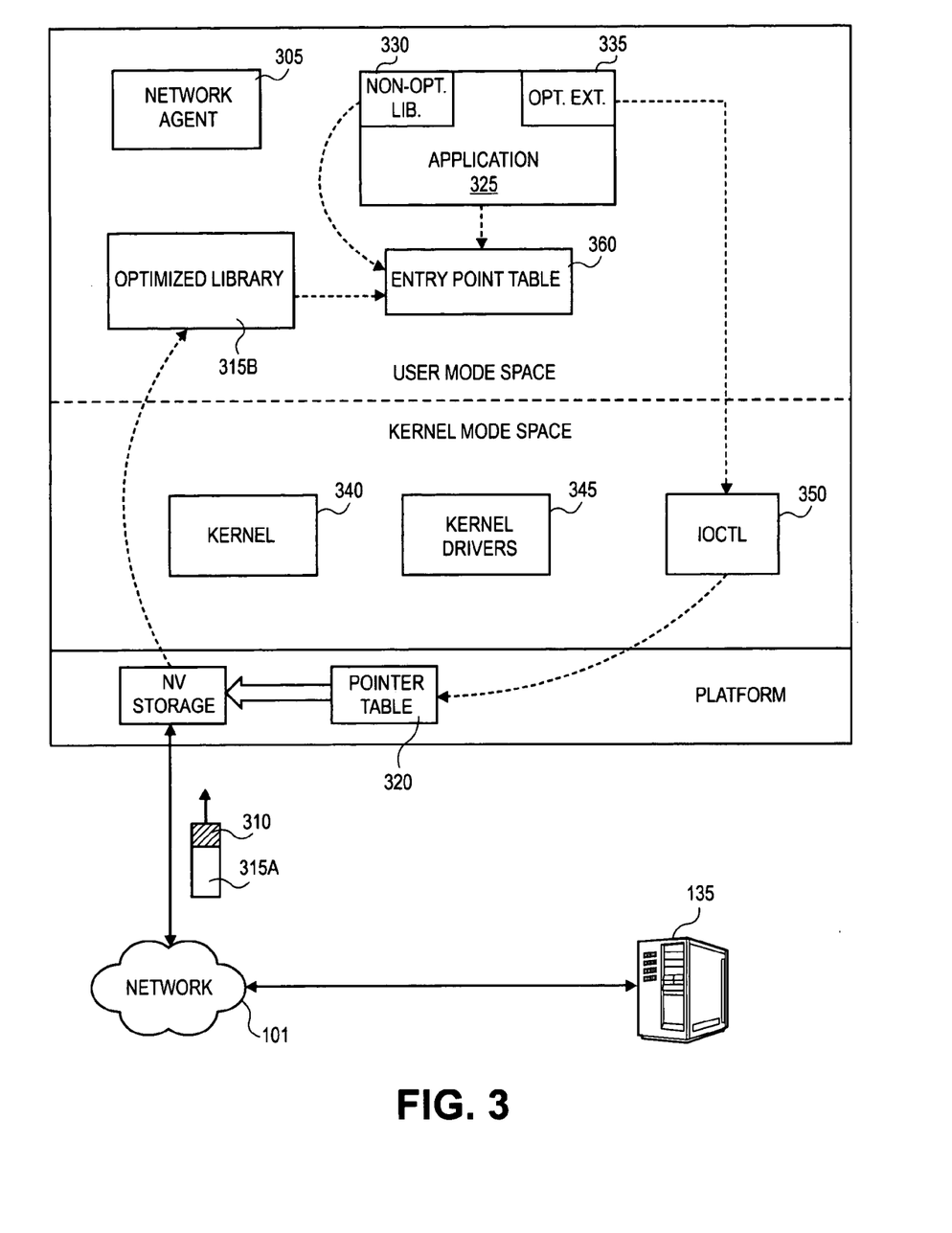
FIG. 3 is a data flow diagram illustrating interactions between entities of a processing system for using platform-based optimization routines received via a network, in accordance with an embodiment of the present invention.

FIG. 2 is a flow chart illustrating a process 200 for transferring optimized libraries to processing system 100, in accordance with an embodiment of the present invention. An optimized library is a collection of optimized routines to allow software entities executing on processing system 100 to execute old tasks in a more efficient manner or to execute new tasks previously not possible. Optimized routines often include updated routines to allow a software entity to interact with a hardware entity of processing system 100 in a more efficient manner by leveraging a new feature of the hardware entity previously not accessible by the software entity. Process 200 is described in connection with FIG. 3. FIG. 3 is a data flow diagram illustrating interactions between software and hardware entities of processing system 100 according to process 200 and a process 500 (described below in connection with FIG. 5).

In a process block 205, processing system 100 is executing within an operating system ("OS") runtime. The particular OS executed may include any of Windows OS (e.g., Windows Server 2003, Windows XP, Windows NT, Windows 2000, etc.), Linux, UNIX, Apple Macintosh OS, or the like. Referring to FIG. 2 and FIG. 3, in a process block 210, a network agent 305 monitors network 101 to determine whether an optimization ("OPT") header packet 310 has been broadcast. In one embodiment, network agent 305 is a type of network daemon that constantly snoops traffic on network 101 looking for OPT header packet 310. Network agent 310 may execute in the background of processing system 100 within either the user mode space (as illustrated) or within the kernel mode space (not illustrated). In one embodiment, OPT header packet 310 is a data structure broadcast over network 101 to indicate to processing systems coupled to network 101 that an optimized library 315A is following.

Figure 4:
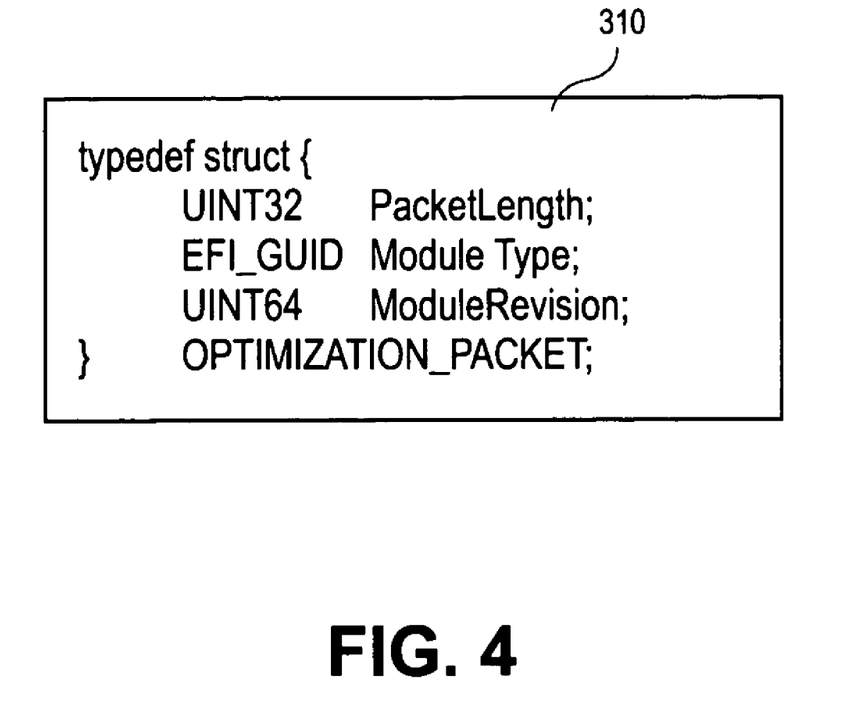
FIG. 4 is a diagram illustrating one possible optimization header packet, in accordance with an embodiment of the present invention.

FIG. 4 is a diagram illustrating one possible embodiment of OPT header packet 310. The illustrated embodiment of OPT header 310 includes a packet length field, a module type field, and module revision field. The packet length field indicates the length of OPT header packet 310. The module type field indicates the type of optimized library 315A, which is to follow. By parsing OPT header packet 310, network agent 305 can inspect the module type field to determine whether the following optimized library 315A is intended for processing system 100. The module type field enables multiple different optimized libraries to be broadcast over network 101 from server 135. Each processing system coupled to network 101 can monitor network 101 for OPT header packets to determine which optimized libraries are intended for which processing system. In one embodiment, the module type field contains a globally unique identifier ("GUID"). Each processing system can maintain a list of GUID's that it is interested in and therefore only save the optimized libraries broadcast with a pertinent module type field. Finally, the module revision field indicates what is the revision or update number of optimized library 315A. Thus, if processing system 101 has already received the particular updated optimized library, then processing system 101 will ignore the currently broadcast updated optimized library.

Returning to FIG. 2, when OPT header packet 310 is received in a decision block 215, process 200 proceeds to a process block 220. In process block 220, processing system 100 receives optimized library 315A and saves optimized library 315A to a nonvolatile ("NV") storage, such as DSU 120 or NV memory 115. In some embodiments, optimized library 315A may be stored to a Host Protected Area ("HPA") of DSU 120. It should be understood that processing system 100 may receive more than one optimized library and the optimized libraries need not necessarily be stored in the same place. In one embodiment, optimized library 315A is saved to NV storage under the control of network agent 305.

In a process block 225, network agent 305 updates a pointer table 320 to reference optimized library 315A within NV storage. Pointer table 320 enables applications executing in the user mode space, such as application 325 to access optimized library 315A (as discussed below). In one embodiment, pointer table 320 is a Secondary System Description Table ("SSDT"), as defined by an Advance Configuration and Power Interface ("ACPI") specification, such as the ACPI Specification, Revision 2.0a, Mar. 31, 2002 (ACPI specifications are available at www.acpi.info). The SSDT is a continuation of a Differentiated System Description Table ("DSDT"). The DSDT supplies implementation and configuration information about a base system.

In another embodiment, pointer table 320 is an Extensible Firmware Interface ("EFI") configuration table of an EFI compliant system (specifications of which may be found at http://www.intel.com/technology/efi). EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., see FIG. 1, NV memory 115). More particularly, EFI enables firmware, in the form of firmware modules and drivers, to be loaded from a variety of different resources, including primary and secondary flash devices, ROMs, various persistent storage devices (e.g., hard disks, CD ROMs, etc.), and even over computer networks.

Figure 5:
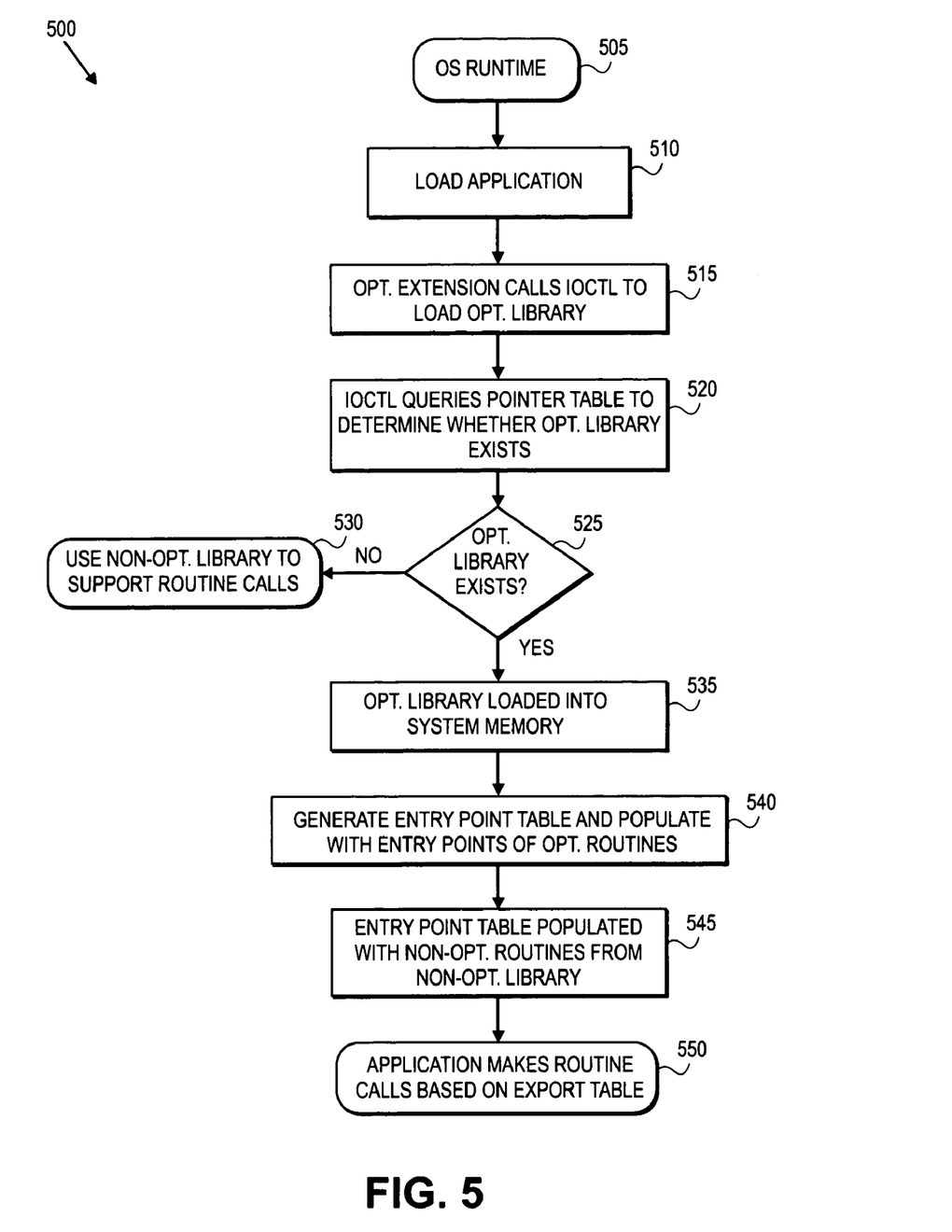
FIG. 5 is a flow chart illustrating a process for using platform-based optimization routines received via a network, in accordance with an embodiment of the present invention.

FIG. 5 is a flow chart illustrating a process 500 for using platform-based optimization routines received via network 101, in accordance with an embodiment of the present invention.

In process block 505, processing system 100 is executing within OS runtime. In a process block 510, processing system 100 loads application 325 into system memory 110 for executing within the user mode space. Bound to application 325 is a non-optimized library 330 and an OPT extension 335. Application 325 may be any program running within the user mode space such as, but not limited to, a word processor, a database, an Internet browsers, a compiler, an editor, or the like. Application 325 may further be an OS process running in the user mode space. Only one application 325 is described herein for the sake of clarity, but it will be understood that embodiments of the present invention may operate with more than one application.

Non-optimized library 330 is bound to the application 325. Non-optimized library 330 includes original routines/functions for application 325 that were tied to application 325 at the time of compiling and linking. Some of the original routines will trap to a kernel 340 or kernel drivers 345 using a system call. Others will not require a system call and will execute entirely within the user mode space. In one embodiment, non-optimized library 330 includes standard C-libraries such as, but not limited to, libc.lib, wow32.lib, wsock32.lib, or the like.

In a process block 515, OPT extension 335 is executed by application 325 after launching application 325. In one embodiment, OPT extension 335 is bound to application 325 during compiling and linking of application 325. OPT extension 335 includes code that knows how to employ optimized routines delivered within optimized library 315A via network 101. Upon executing, OPT extension 335 makes a system call to an input/output controller ("IOCTL") 350 to load optimized library 315A into system memory 110 as optimized library 315B. In one embodiment, IOCTL 350 is an application/driver executing within the kernel mode space which publishes an application programming interface ("API") into the user mode space for applications, such as application 325, to interact with IOCTL 350. In one embodiment, OPT. Extension 335 issues an OPTLibInit( ) function call to initialize optimized library 315B. The OPTLibInit( ) function call returns a Boolean value to indicate if and when optimized library 315B has been properly established.

Upon being called by OPT extension 335, IOCTL 350 queries pointer table 320 to determine whether a corresponding optimized library exists for use by application 325 (process block 520). In a decision block 525, if a corresponding optimized library does not exist, then process 500 continues to a process block 530. In process block 530, application 325 simply uses non-optimized library 330 bound to itself to support routine calls.

Returning to decision block 525, if a corresponding optimized library does exits, then process 500 continues to a process block 535. In process block 535, optimized library 315A is loaded into system memory 110, illustrated as optimized library 315B in FIG. 3. In one embodiment, optimized library 315B is loaded at the behest of IOCTL 350. Once loaded, application 325 is given access to the optimized routines within optimized library 315B by advertising entry points (e.g., memory addresses) of each of the optimized routines.

In a process block 540, an entry point table 360 is generated and populated with the entry points of the optimized routines. Entry point table 360 advertises the entry points to each of the optimized routines of optimized library 315B for use by application 325. In one embodiment, each application executed on processing system 100 has its own associated entry point table. In one embodiment, entry point table 360 is similar to the import and export tables associated with a Dynamic Link Library ("DLL") of the Microsoft Windows OS. In one embodiment, to populate entry point table 360, optimized library 315B exports the entry points to entry point table 360 by entering memory address of each optimized routine into entry point table 360.

Figure 6:
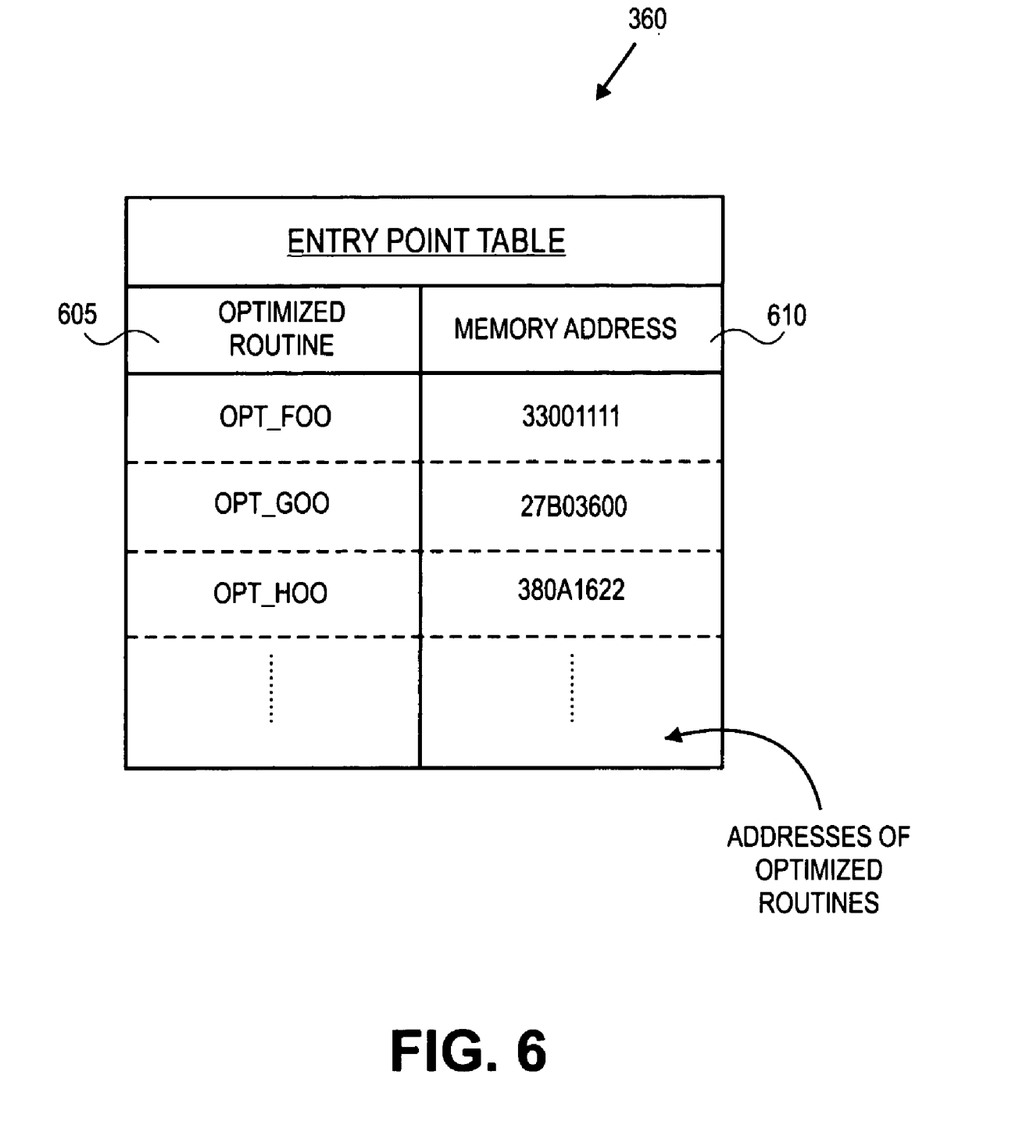
FIG. 6 illustrates an entry point table containing memory addresses of optimized routines, in accordance with an embodiment of the present invention.

FIG. 6 illustrates one embodiment of entry point table 360, in accordance with the teachings described herein. Entry point table 360 includes an optimized routine column 605 and a memory address column 610. Optimized routine column 605 includes various optimized routines, such as OPT_F00, OPT_G00, and OPT_H00 indexed to their corresponding memory addresses in memory address column 610. Optimized routines OPT_F00, OPT_G00, and OPT_H00 may correspond to non-optimized routines F00, G00, and H00 found in non-optimized library 330. Thus, if application 325 were to call non-optimized routine F00, entry point table 360 would redirect the call to OPT_F00 instead. OPT_F00 would execute the same function and return the same result, but do so in a more efficient manner by leveraging hardware updates within processing system 100, of which would not be taken advantage, if non-optimized routine F00 were executed. It should be understood that the illustrated optimized routine names and corresponding memory addresses are demonstrative only. Entry point table 360 may include optimized routines for interaction with a variety of hardware entities of processing system 100, including for example, processor 105, chipset 130, system memory 110, NV memory 115, and the like.

Returning to FIG. 5, if an error occurs during process block 540 or there is no optimized routine to correspond to one of the non-optimized routines within non-optimized library 330, then entry point table 360 is populated with a non-optimized routine from non-optimized library 330 (process block 545). In this case, the memory address of the corresponding non-optimized routine may be substituted in place of the memory address of the optimized routine. For example, if an error occurred while the memory address of OPT_F00 is being exported to entry point table 360, then the memory address of non-optimized routine F00 may be substituted in its place. Thus, when application 325 calls OPT_F00, F00 would be executed in its place.

In a process block 550, application 325 makes calls based on the memory addresses listed in entry point table 360. As discussed above, entry point table 360 is generated each time application 325 is loaded into system memory 110. Thus, if processing system 100 receives a new optimized library via network 101 while a first instance of application 325 is currently open and executing on processing system 100, this first instance will not have access to the new optimized routines. However, if a second instance of application 325 is opened after receiving the new optimized library, the entry point table generated for the new instance of application 360 will have access to the new optimized routines. In this scenario, the second instance of application 325 would execute more efficiently (e.g., faster) on processing system 100 than the first instance of application 325.

Figure 7:
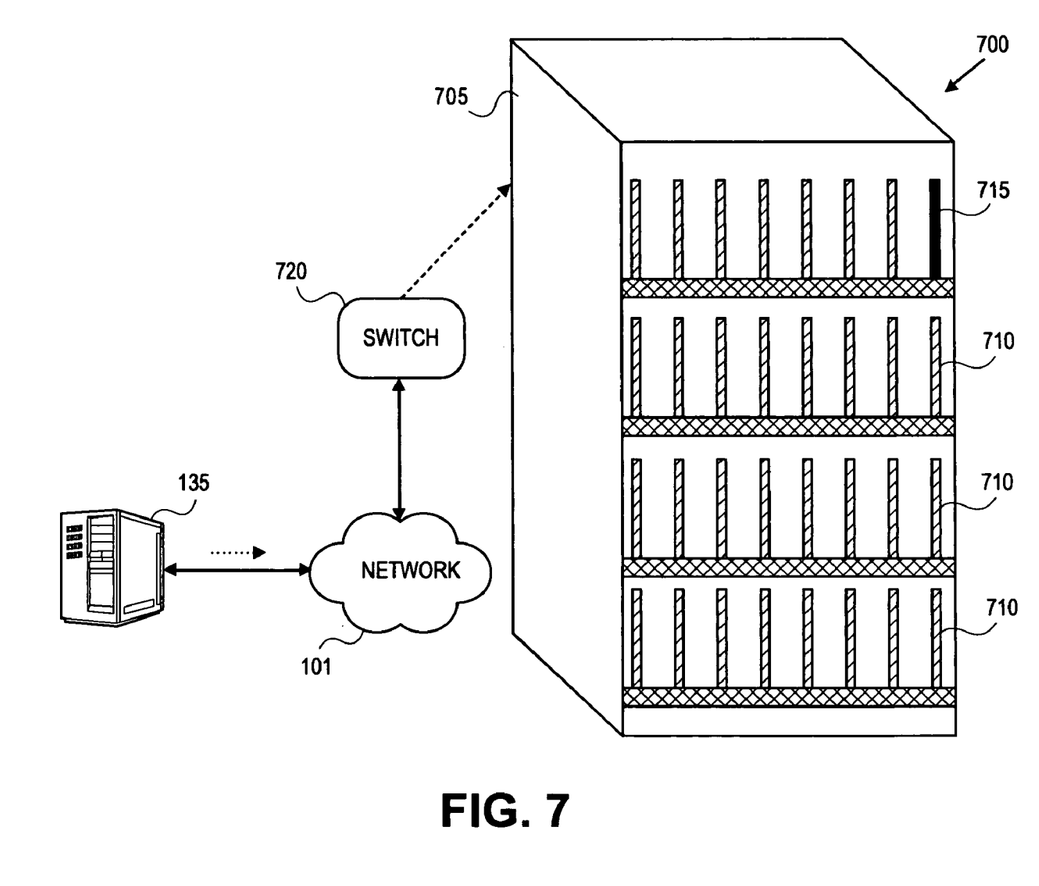
FIG. 7 is a diagram illustrating a rack of blade servers for receiving platform-based optimization routines via a network, in accordance with an embodiment of the present invention.

FIG. 7 is diagram illustrating a rack of blade servers 700 for receiving optimized libraries via network 101, in accordance with an embodiment of the present invention. The illustrated embodiment of rack of blade servers 700 includes a chassis 705, blade servers 710, a management module 715, and a switch 720. Blade servers 715 represent one possible embodiment of processing system 100.

The components of rack of blade servers 700 are interconnected as follows. Typically, blade servers 710 are mounted via edge connectors into slots organized in an array fashion within chassis 705. When the edge connector of one of blade servers 710 is inserted into one of the slots of chassis 705, power is delivered to the particular blade server 710. In one embodiment, blade servers 710 are further communicatively coupled via an out-of-band ("OOB") channel to management module 715. Blade servers 710 are further coupled to a network 101 via switch 720.

Typically, management module 715 is an independent hardware module with dedicated firmware to perform management functions, such as for example, coordinating arbitration and allocation of shared resources between blade servers 710, logging system errors, coordinating fault resilient booting of blade servers 710, fan control, power supply monitoring and regulation, and the like. Generally, management module 715 controls switch 720 and is able to grant or deny each of blade servers 710 access to network 101. Further, management module 115 has a known internet protocol ("IP") address which can be accessed by a remote user (e.g., server 135) via network 101.

In one embodiment, management module 715 is a Unified Management Module ("UMM"). From a hardware perspective, a UMM may be similar or identical to blade servers 710; however, the UMM includes specialized firmware and/or software for conducting management functions. In yet another embodiment, management module 715 may be a chassis management module ("CMM") mounted to chassis 105 (not illustrated). A CMM performs similar functions to a UMM.

In the illustrated embodiment of rack of blade servers 700, blade servers 710 are illustrated as being vertically mounted in rows. However, it should be appreciated that the illustrated embodiment of rack of blade servers 700 is only one possible embodiment. Other possible embodiments include blade servers 710 mounted horizontally in columns, or various other efficient configurations.

Figure 8:
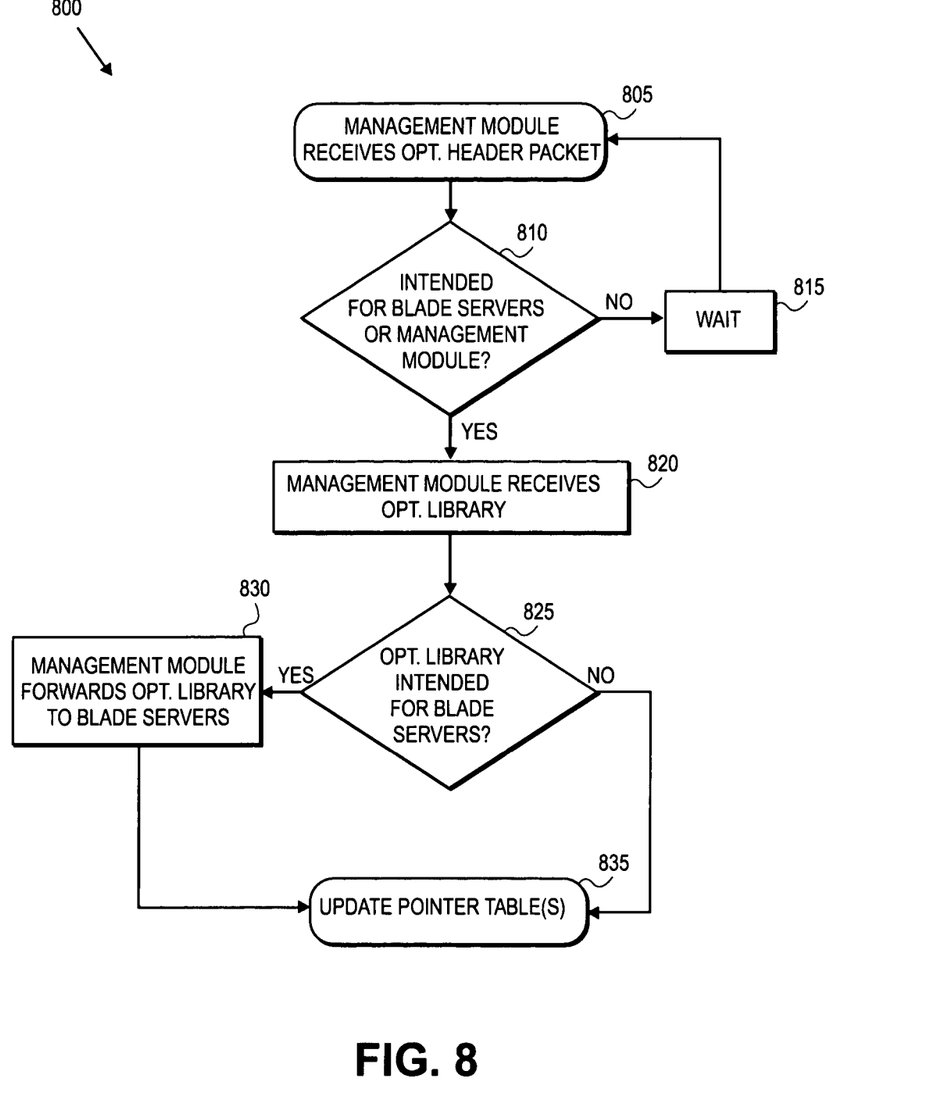
FIG. 8 is a flow chart illustrating a process for diffusing platform-based optimization routines to blade servers from a management module, in accordance with an embodiment of the present invention.

FIG. 8 is a flow chart illustrating a process 800 for diffusing optimized libraries to blade servers 710 from management module 715, in accordance with an embodiment of the present invention.

In a process block 805, management module 715 receives an optimization header packet (e.g., OPT. header packet 310) via network 101. In a decision block 810, management module 715 parses the optimization header packet to determine if the following optimized library is intended for one (or more) of blade servers 710 or management module 715 itself. If management module 715 determines that the optimization library, which is to follow, is not intended for one of blade servers 710 or management module 715 itself, then process 800 continues to a process block 815. In process block 815, management module 715 ignores the optimized library and waits until another optimization header packet is received in process block 805.

Returning to decision block 810, if management module 715 determines that the following optimized library is intended for itself or one of blade servers 710, then process 800 continues to a process block 820. In process block 820, management module 715 receives the optimized library via network 101 and saves a copy of the optimized library to an attached NV storage device. If the optimized library is intended for one or more of blade servers 710 (decision block 825), then process 800 continues to a process block 830. In process block 830, management module 715 forwards the optimized library to the intended blade servers 710. In one embodiment, management module 715 forwards the optimized library via the OOB channel to the intended blade servers 710. In one embodiment, management module 715 broadcasts the optimization header packet that it received via network 101 (or a copy thereof) followed by the optimized library to each of blade servers 710 via the OOB channel. In the latter embodiment, each of the intended blade servers 710 will individually execute processes 200 and 500, described above, to receive and use the optimized libraries. In a process block 835, pointer tables of each of the intended blade servers 710 are updated as described in connection with process block 225 of FIG. 2.

Returning to decision block 825, if the optimized library is intended for management module 715, then process 800 continues directly to process block 835 where management module 715 updates its own pointer table. It should be appreciated that process 800 is a modified version of process 200 tailored for high density computing systems, such as rack of blade servers 700. Process 800 allows server 135 to forward a single copy of the optimized library to management module 715 via network 101, which in turn diffuses the optimized library to each of blade servers 710 out-of-band of network 101. Thus, process 800 illustrates a top down technique for diffusing optimized libraries. One of ordinary skill having the benefit of the present disclosure will understand that process 800 could be modified to perform a lateral diffusion technique wherein one of blade servers 710 directly receives an optimized library from server 135 via network 101 and thereafter distributes it to each of its brethren blade servers 710 or even management module 715 via the OOB channel.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of interacting with a hardware entity of a processing system, comprising:
   receiving an optimized library via a network, the optimized library including at least one optimized routine to interact with the hardware entity of the processing system;
   determining whether the optimized library is suitable for use by an application executing on the processing system in response to a library load request by the application;

loading the optimized library into system memory of the processing system if the optimized library is suitable for use by the application to interact with the hardware entity of the processing system;

populating an entry point table with an entry point for the optimized routine if the optimized library is suitable for use by the application, the entry point referencing a location within the system memory of the optimized routine;

populating the entry point table with an entry point of a non-optimized routine of a non-optimized library if the optimized library is not suitable for use by the application, the non-optimized routine to interact with the hardware entity of the processing system;

advertising entry points stored in the entry point table to the application; and invoking a routine referenced by the advertised entry point for the application to interact with the hardware entity of the processing system, wherein the advertised entry point corresponds to the optimized routine if the optimized library is suitable for use by the application and wherein the advertised entry point corresponds to the non-optimized routine if the optimized library is not suitable for use by the application.

2. The method of claim 1 wherein the optimized routine comprises updated code for use by the application to increase interaction efficiency with the hardware entity of the processing system.

3. The method of claim 1 wherein the receiving the optimized library via the network comprises receiving the optimized library via the network during an operating system ("OS") runtime of the processing system.

4. The method of claim 3, further comprising:
receiving an optimization header packet via the network; and
determining that the optimized library is suitable for the processing system based on a module type field within the optimization header packet.

5. The method of claim 4 wherein the module type field includes a globally unique identifier ("GUID") for determining that the optimized library is suitable for the processing system.

6. The method of claim 4, further comprising:
ignoring other optimized libraries broadcast on the network if corresponding other optimization packets are determined to be unsuitable for the processing system based on the module type filed.

7. The method of claim 3, further comprising:
storing the optimized library to a nonvolatile storage device of the processing system; and
inserting a entry into a pointer table of the processing system, the entry pointing to the optimized library.

8. The method of claim 7 wherein the pointer table comprises one of a Secondary System Description Table ("SSDT") defined by an Advanced Configuration and Power Interface ("ACPI") and an Extensive Firmware Interface ("EFI") configuration table.

9. The method of claim 7 wherein determining whether the optimized library is suitable for use by the application, comprises:
executing an optimization extension bound to the application, the optimization extension to request a load of the optimized library; and
querying the pointer table for the entry pointing to the optimized library stored within the nonvolatile storage device.

10. The method of claim 9 wherein the optimized library is further loaded into a user mode space of the processing system.

11. The method of claim 1 wherein the processing system comprises a management module of a rack of blade servers, and further comprising forwarding the optimized library to one or more of the blade servers via an out-of-band channel.

12. A computer-readable storage medium that provides instructions that, if executed by a machine, will cause the machine to perform operations comprising:
identifying that an optimized library transmitted over a network is intended for the machine, the optimized library including at least one optimized routine for interacting with a hardware entity of the machine;
receiving the optimized library via the network;
determining whether the optimized library is suitable for use by an application executing on the processing system in response to a library load request by the application;
loading the optimized library into system memory of the processing system if the optimized library is suitable for use by the application;
populating an entry point table with an entry point for the optimized routine if the optimized library is suitable for use by the application, entry point referencing a location within the system memory of the optimized routine;
populating the entry point table with an entry point of a non-optimized routine of a non-optimized library if the optimized library is not suitable for use by the application, the non-optimized routine to interact with the hardware entity of the processing system;
advertising entry points stored in the entry point table to the application; and
invoking a routine referenced by the advertised entry point for the application to interact with the hardware entity of the processing system, wherein the advertised entry point corresponds to the optimized routine if the optimized library is suitable for use by the application and wherein the advertised entry point corresponds to the non-optimized routine if the optimized library is not suitable for use by the application.

13. The computer-readable storage medium of claim 12 wherein identifying the optimized library, receiving the optimized library, and advertising the optimized library are to be performed during an operating system ("OS") runtime of the machine.

14. computer-readable storage medium of claim 13 wherein the optimized routine comprises updated code to increase interaction efficiency with the hardware entity of the machine.

15. The computer-readable storage medium of claim 14 wherein the hardware entity comprises a processor of the machine.

16. The computer-readable storage medium of claim 12 wherein identifying that the optimized library transmitted over the network is intended for the machine further comprises performing operations, including:
receiving an optimization header packet via the network; and
determining that the optimized library is suitable for the machine based on a module type field within the optimization header packet.

17. The computer-readable storage medium of claim 12, further providing instructions that, if executed by the machine, will cause the machine to perform further operations, comprising:

storing the optimized library to a nonvolatile storage device of the machine; and inserting an entry into a pointer table of the machine, the entry to point to the optimized library.

18. The computer-readable storage medium of claim 17, further providing instructions that, if executed by the machine, will cause the machine to perform further operations, comprising:

executing an optimization extension bound to the application, the optimization extension to request a load of the optimized library;

querying the pointer table for the entry pointing to the optimized library stored within the nonvolatile storage device; and loading the optimized library into the user mode space of the machine.

19. A processing system, comprising;

a processor;

a network link communicatively coupled to the processor; and a storage device communicatively coupled to the processor, the storage device including instructions which when executed by the processor perform operations, comprising:

monitoring traffic on the network link for an optimized library including at least one optimized routine intended for interacting with a hardware entity of the processing system;

receiving the optimized library via the network link;

determining whether the optimized library is suitable for use by an application executing on the processing system in response to a library load request by the application;

loading the optimized library into system memory of the processing system if the optimized library is suitable for use by the application;

populating an entry point table with an entry point for the optimized routine if the optimized library is suitable for use by the application, the entry point referencing a location within the system memory of the optimized routine;

populating the entry point table with an entry point of a non-optimized routine of a non-optimized library if the optimized library is not suitable for use by the application, the non-optimized routine to interact with the hardware entity of the processing system;

advertising entry points stored in the entry point table to the application; and invoking a routine referenced by the advertised entry point for the application to interact with the hardware entity of the processing system, wherein the advertised entry point corresponds to the optimized routine if the optimized library is suitable for use by the application and wherein the advertised entry point corresponds to the non-optimized routine if the optimized library is not suitable for use by the application.

20. The processing system of claim 19 wherein the instructions are to be executed by the processing system during an operating system runtime of the processing system.

21. The processing system of claim 19 wherein execution of the instructions further performs operations comprising:

parsing an optimization header packet received via the network link; and recognizing whether the optimized library is intended for the processing system based on a module type field of the of the optimization header packet.

22. The processing system of claim 19 wherein the application includes an optimization extension to request a load of the optimized library upon execution of the application.

23. The processing system of claim 19 wherein the hardware entity is the processor.

24. The processing system of claim 23 wherein the optimized routine comprises updated code for interacting with the processor in a more efficient manner.

* * * * *

UNITED STATES PATENT AND TRADEMARK OFFICE
CERTIFICATE OF CORRECTION

| | | |
|---|---|---|
| PATENT NO. | : 7,281,243 B2 | |
| APPLICATION NO. | : 10/748030 | |
| DATED | : October 9, 2007 | |
| INVENTOR(S) | : Rothman et al. | |

It is certified that error appears in the above-identified patent and that said Letters Patent is hereby corrected as shown below:

In column 1, at line 38, delete "gamer" and insert --garner--.
In column 1, at line 44, delete "Modem" and insert --Modern--.

Signed and Sealed this

Twenty Second Day of April, 2008

JON W. DUDAS
*Director of the United States Patent and Trademark Office*